United States Patent
Yamazaki et al.

(10) Patent No.: US 7,049,369 B2
(45) Date of Patent: May 23, 2006

(54) STYRENE RESIN COMPOSITION AND PROCESS FOR PRODUCING THE SAME

(75) Inventors: Hiroyuki Yamazaki, Yachimata (JP); Tsuyoshi Morita, Chiba (JP); Ren-Hua Jin, Tokyo (JP)

(73) Assignees: Dainippon Ink and Chemicals, Inc., Tokyo (JP); Kawamura Institute of Chemical Research, Sakura (JP)

( * ) Notice: Subject to any disclaimer, the term of this patent is extended or adjusted under 35 U.S.C. 154(b) by 0 days.

(21) Appl. No.: 10/501,920

(22) PCT Filed: Jan. 30, 2003

(86) PCT No.: PCT/JP03/00904

§ 371 (c)(1), (2), (4) Date: Jul. 27, 2004

(87) PCT Pub. No.: WO03/064524

PCT Pub. Date: Aug. 7, 2003

(65) Prior Publication Data

US 2005/0038196 A1    Feb. 17, 2005

(30) Foreign Application Priority Data

Jan. 31, 2002    (JP) .............................. 2002-023625

(51) Int. Cl.
  *C08F 212/04*    (2006.01)
(52) U.S. Cl. ........................................ 525/70; 525/241
(58) Field of Classification Search .................. 525/70, 525/241

See application file for complete search history.

(56) References Cited

U.S. PATENT DOCUMENTS

| | | | |
|---|---|---|---|
| 4,973,640 A | 11/1990 | Matsuda et al. | |
| 5,132,384 A | 7/1992 | Matsuda et al. | |
| 5,708,112 A * | 1/1998 | Kihara et al. | 526/340 |
| 6,093,781 A * | 7/2000 | Demirors et al. | 526/347 |
| 6,593,429 B1 * | 7/2003 | Kim et al. | 525/313 |

FOREIGN PATENT DOCUMENTS

| | | |
|---|---|---|
| CA | 2030598 | 5/1991 |
| DE | 68915658 T2 | 3/1990 |
| EP | 0358524 A2 | 3/1990 |
| EP | 0430073 A2 | 6/1991 |
| GB | 1015619 | 1/1966 |
| JP | 41-19511 | 11/1966 |
| JP | 2-167320 | 6/1990 |
| JP | 3-160007 | 7/1991 |
| JP | 4-126710 | 4/1992 |
| JP | 7-166013 | 6/1995 |
| JP | 8-92318 | 4/1996 |
| JP | 9-316261 | 12/1997 |

OTHER PUBLICATIONS

Tomalia et al., "Starburst Dendrimers: Molecular-Level Control of Size, Shape, Surface Chemistry, Topology, and Flexibility from Atoms to Macroscopic Matter", *Angew. Chem. Int. Ed. Engl.* 29 (1990) 138-175.

\* cited by examiner

*Primary Examiner*—Jeffrey Mullis
(74) *Attorney, Agent, or Firm*—Armstrong, Kratz, Quintos, Hanson & Brooks, LLP

(57) ABSTRACT

A styrene resin composition is provided which has a high molecular weight enabling a molded product obtained therefrom to have satisfactory strength, has a high melt mass-flow rate, high melt tension, and hence excellent moldability, and is less apt to gel during production, and a process for producing such a styrene resin composition. The styrene resin composition comprises a linear polystyrene having a weight average molecular weight of 200,000 to 350,000 and a multibranched polystyrene having a weight average molecular weight of 1,000,000 to 10,000,000, has an average molecular weight of 250,000 to 700,000, and a melt mass-flow rate (MFR) and melt tension (MT) which satisfy the following formulas (1) and (2) respectively:

$$MFR \wedge 45 \times \exp(-0.1 \times Mw \times 10^{-4}) \qquad (1)$$

$$MT \wedge 0.07 Mw \times 10^{-4} + 1.8. \qquad (2)$$

10 Claims, 3 Drawing Sheets

STYRENE RESIN COMPOSITION AND PROCESS FOR PRODUCING THE SAME

BACKGROUND OF THE INVENTION

1. Field of the Invention

The present invention relates to a styrene resin composition comprising a linear polystyrene and a multibranched polystyrene, and a process for producing such a styrene resin composition. Compared to a linear polystyrene of the same weight average molecular weight, a styrene resin composition of the present invention has a higher melt mass-flow rate and a superior fluidity during molding, and is consequently ideally suited for use as a molding material in a variety of molding processes.

2. Description of Related Art

Because styrene based resins exhibit good rigidity and excellent dimensional stability, and are also cheap to produce, they are widely used in molding applications, in recent years, improved strength has been sought from styrene based resins in a number of applications. Although increasing the molecular weight of a styrene based resin is an effective method of increasing the strength of the styrene based resin, in the case of conventional linear polystyrenes, increasing the molecular weight invites an increase in the melt viscosity, with a resulting marked deterioration in the moldability.

The addition of plasticizers is typically used as a method of improving this type of deterioration in moldability, however this causes a reduction in the mechanical strength of the final resin molded product. One example of a process which aims to resolve this problem by imparting a branched structure to the polystyrene is disclosed in Japanese Examined Patent Application, Second Publication No. Sho 41-19511, wherein branching is introduced into the polystyrene by using styrene and a polyfunctional peroxide compound such as 2,2-bis(4,4-di-t-butyl-peroxy-cyclohexyl)-propane as a polymerization initiator, although even with this process, the degree of branching can only be controlled at a low level, and achieving a satisfactory branched structure is difficult.

Japanese Unexamined Patent Application, First Publication No. Hei 7-166013, in an attempt to impart a branched structure to polystyrene and give a styrene based resin with a high molecular weight and a favorable level of moldability, discloses a polystyrene based copolymer with a weight average molecular weight of 200,000 to 2,000,000 produced by introducing branched structures into its polystyrene chain by copolymerizing styrene with a compound such as divinylbenzene containing at least two vinyl groups. The formed polystyrene based copolymer is disclosed as exhibiting excellent moldability, although because the copolymer is prone to gelation during the polymerization process, it is difficult to produce industrially, and because the amount of the other compound having at least vinyl groups is restricted, achieving significant increases in the physical properties of the product resin is difficult.

Japanese Unexamined Patent Application, First Publication No. Hei 9-316261, in another attempt to give a styrene based resin with a high molecular weight and a favorable level of moldability, discloses a mixture of a star branched polystyrene produced by an anionic polymerization, and a linear polystyrene produced by a radical polymerization, and reports that a styrene based resin composition with good fluidity and mechanical strength, and favorable moldability can be produced with no loss of rigidity or heat resistance. However, because an anionic polymerization is used, a complicated control is required, for making the process unsuited to industrial production.

SUMMARY OF THE INVENTION

An object of the present invention is to provide a styrene resin composition which has a high molecular weight enabling a molded product obtained therefrom to have satisfactory strength, has a high melt mass-flow rate, high melt tension, and hence excellent moldability, and is less apt to gel during production, and a process for producing such a styrene resin composition.

As a result of intensive research aimed at achieving the above object, the inventors of the present invention have found that a styrene resin composition comprising a multibranched polystyrene obtained by copolymerizing a multibranched macromonomer and styrene, and a linear polystyrene exhibits excellent melt tension (MT), while also providing a high melt mass-flow rate (MFR), excellent moldability and good resistance to gelation, and they were hence able to complete the present invention.

Accordingly, the present invention provides a styrene resin composition comprising a linear polystyrene having a weight average molecular weight of 200,000 to 350,000 and a multibranched polystyrene having a weight average molecular weight of 1,000,000 to 10,000,000, which has an average molecular weight of 250,000 to 700,000, and a melt mass-flow rate (MFR) and melt tension (MT) which satisfy the following formulas (1) and (2) respectively.

$$MFR \wedge 45 \times \exp(-0.1 \times Mw \times 10^{-4}) \qquad (1)$$

(wherein, MFR and Mw denote the melt mass-flow rate and the weight average molecular weight respectively for the styrene resin composition)

$$MT \wedge 0.07 Mw \times 10^{-4} + 1.8 \qquad (2)$$

(wherein, MT and Mw denote the melt tension and the weight average molecular weight respectively for the styrene resin composition)

Furthermore, the present invention also provides a process for producing the above styrene resin composition by caring out a radical polymerization of (A) a multibranched macromonomer having a branched structure containing electron attracting groups and tertiary carbon atoms in which the 3 bonds other than the bond bonded to an electron attracting group are all bonded to other carbon atoms, and double bonds bonded directly to an aromatic ring, and (B) styrene.

In addition, the present invention also provides a process for producing the above styrene resin composition, wherein the multibranched polystyrene is produced by caring out a radical polymerization of (A) a multibranched macromonomer having a branched structure containing a repeating structural unit selected from a group consisting of ether linkages, ester linkages and amide linkages, and double bonds at the branch terminals, and (B) styrene.

The present invention provides a styrene resin composition which has a high weight average molecular weight enabling a molded product obtained therefrom to have satisfactory strength, has a higher melt mass-flow rate and melt tension than a conventional linear polystyrene composition having the same weight average molecular weight, and consequently offers excellent moldability, and is less apt to gel during production, and a process for producing such a styrene resin composition.

DETAILED DESCRIPTION OF THE INVENTION

The followings are a more detailed description of a resin composition of the present invention.

A styrene resin composition of the present invention is containing a multibranched polystyrene obtained by a polymerization of a multibranched macromonomer having a plurality of double bonds at the molecular terminals with styrene, and a linear polystyrene that is produced at the same time.

There are not particular restrictions on the branched structure of the multibranched polystyrene contained within the styrene resin composition of the present invention, although multibranched polystyrenes having branched structures containing electron attracting groups and tertiary carbon atoms, in which the 3 bonds other than the bond bonded to an electron attracting group are all bonded to other carbon atoms, and multibranched polystyrenes having branched structures containing a repeating structural unit selected from a group consisting of ether linkages, ester linkages and amide linkages are preferred.

The branched structure of the multibranched polystyrene is derived from the multibranched macromonomer that is copolymerized with styrene. The electron attracting group content of the branched structure of the multibranched polystyrene contained within a styrene resin composition of the present invention is typically within a range from $2.5 \times 10^{-4}$ to $5.0 \times 10^{-1}$ millimols, and preferably from $5.0 \times 10^{-4}$ to $5.0 \times 10^{-2}$ millimols, per 1 g of the multibranched polystyrene.

Figure 1:
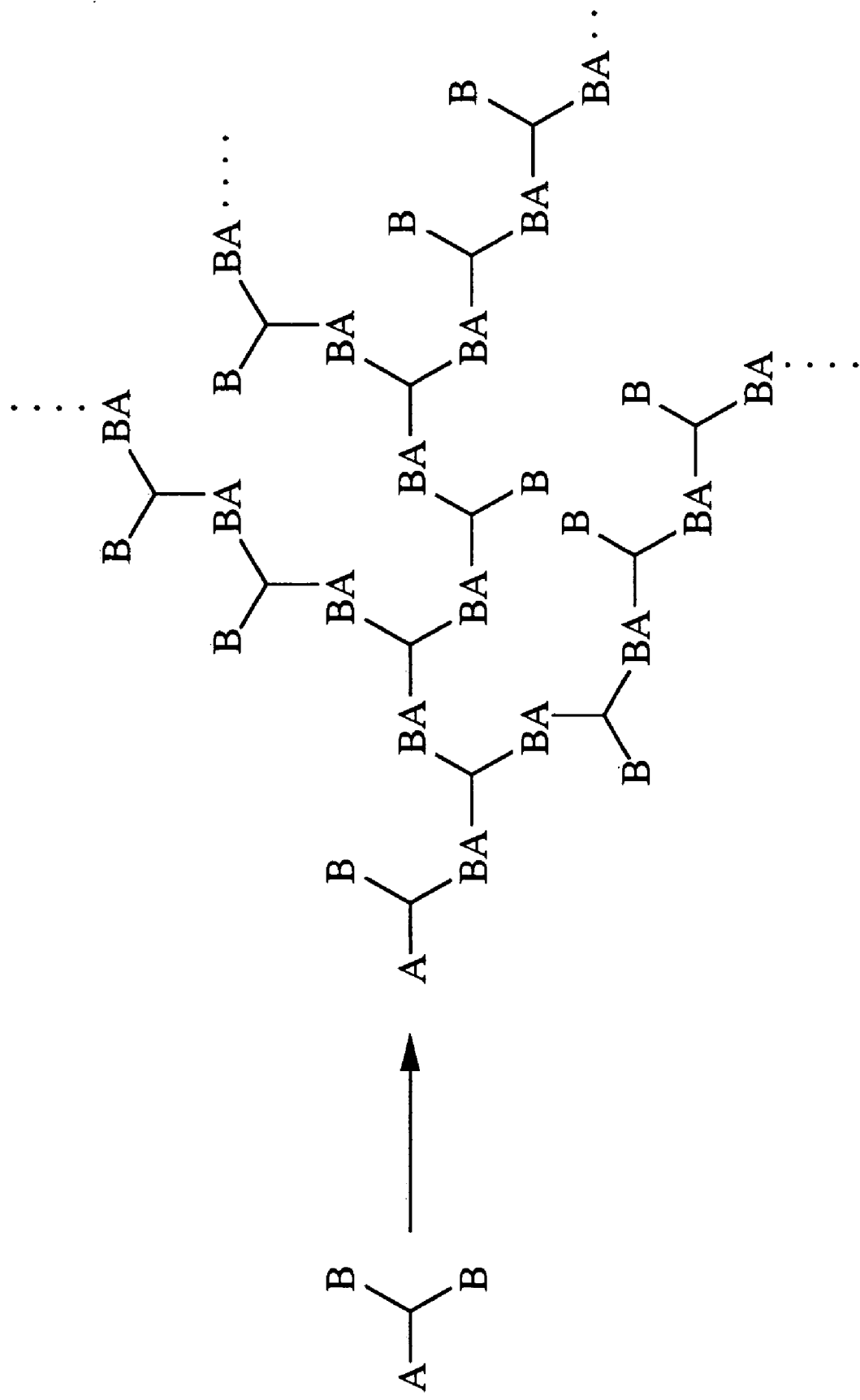
FIG. 1 is a schematic illustration showing the branched structure of a multibranched macromonomer derived from an $AB_2$ type monomer.

There are not particular restrictions on the multibranched macromonomer used in the present invention provided it contains a multibranched chain, and one example of a preferred structure is a multibranched macromonomer having, within a single molecule, a branched structure containing electron attracting groups and tertiary carbon atoms in which the 3 bonds other than the bond bonded to an electron attracting group are all bonded to other carbon atoms, and double bonds bonded directly to an aromatic ring. This type of multibranched macromonomer is a hyperbranched macromonomer derived from an $AB_2$ monomer, and has a branched structure similar to that shown schematically in FIG. 1.

This type of branched structure can be produced easily by a nucleophilic substitution reaction of active methylene groups with bonded electron attracting groups. Examples of the electron attracting group include —CN, —NO$_2$, —CONH$_2$, —CON(R)$_2$, —SO$_2$CH$_3$, and —P(~O)(OR)$_2$, and in those cases in which the methylene group to which the electron attracting group is bonded is bonded directly to an aromatic ring or a carbonyl group, the activity of the methylene group is further increased.

One example of the multibranched macromonomer used in the present invention is a multibranched macromonomer containing a branched chain comprising a repeating unit represented by a general formula (I) shown below.

General formula (I)

[wherein, Y$_1$ denotes an electron attracting group selected from a group consisting of —CN, —NO$_2$, —CONH$_2$, —CON(R)$_2$, —SO$_2$CH$_3$, and —P(~O)(OR)$_2$ (wherein R denotes an alkyl group or an aryl group), Y$_2$ denotes an arylene group, —O—CO— or —NH—CO—, and Z denotes a group selected from a group consisting of —(CH$_2$)$_n$O—, —(CH$_2$CH$_2$O)$_n$—, and —(CH$_2$CH$_2$CH$_2$O)$_n$—, providing that Y$_2$ is either —O—CO— or —NH—CO—, Z denotes —(CH$_2$)$_n$—, —(CH$_2$)$_n$Ar—, —(CH$_2$)$_n$O—Ar—, —(CH$_2$CH$_2$O)$_n$—Ar—, or —(CH$_2$CH$_2$CH$_2$O)$_n$—Ar— (wherein Ar denotes an aryl group)]

Y$_2$ may be an arylene group selected from a group consisting of the formulas shown below, for example.

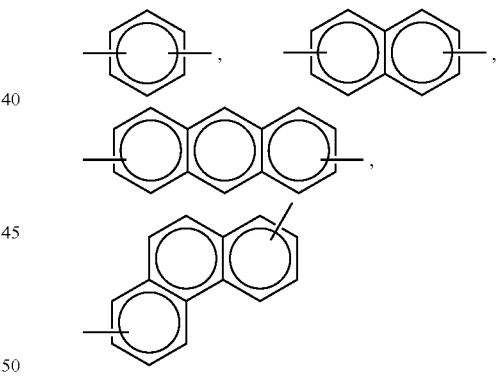

Of these, structures in which Y$_1$ is —CN and Y$_2$ is a phenylene group are preferred. In those cases where Y$_2$ is a phenylene group, although there are not particular restrictions on the bonding position of Z, and any of the o-position, the m-position and the p-position are acceptable, the p-position is preferred. Furthermore, there are not particular restrictions on the number of repeating units n in the group Z, although from the viewpoint of ensuring solubility within styrene, values from 1 to 12 are preferred, and values from 2 to 10 are even more desirable.

The multibranched macromonomer having the branched structure described above can be produced in the presence of a basic compound by:

(i) producing, as a precursor, a multibranched self condensing type condensation polymer by conducting a nucleophilic substitution reaction of an AB$_2$ type monomer having, within a single molecule, an active methylene group and a leaving group for the nucleophilic substitution reaction of the active methylene group, and then (ii) conducting a nucleophilic substitution reaction of the unreacted active methylene groups or methyne groups remaining in this condensation polymer with a compound comprising, within a single molecule, a double bond bonded directly to an aromatic ring and a leaving group for the nucleophilic substitution reaction of the active methylene group.

In the above description, the leaving group for the nucleophilic substitution reaction of the active methylene group refers to a halogen atom or an —OS(~O)$_2$R group (wherein R denotes an alkyl group or an aryl group) that is bonded to a tertiary carbon atom, and specific examples include a bromine atom, a chlorine atom, a methylsulfonyloxy group or a tosyloxy group.

Strong alkalis such as sodium hydroxide or potassium hydroxide are preferred as the basic compound, and are used in the form of an aqueous solution during the reactions.

Examples of the AB$_2$ type monomer having, within a single molecule, an active methylene group and a leaving group for the nucleophilic substitution reaction of the active methylene group include halogenated alkoxy-phenylacetonitriles such as bromoethoxy-phenylacetonitrile and chloromethylbenzyloxy-phenylacetonitrile, and phenylacetonitriles with a tosyloxy group such as tosyloxy-(ethyleneoxy)-phenylacetonitrile and tosyloxy-di(ethyleneoxy)-phenylacetonitrile.

Representative examples of the compound comprising, within a single molecule, a double bond bonded directly to an aromatic ring and a leaving group for the nucleophilic substitution reaction of the active methylene group include chloromethylstyrene and bromomethylstyrene.

The reaction (i) described above is used to synthesize a condensation polymer that acts as a precursor, and the reaction (ii) is used to synthesize a multibranched macromonomer by introducing double bonds bonded directly to an aromatic ring into the precursor. The reaction (i) and the reaction (ii) can be either conducted separately and sequentially, or both reactions can be conducted simultaneously within the same reaction system. The molecular weight of the multibranched macromonomer can be controlled by altering the relative proportions of the monomer and the basic compound.

Another example of a preferred multibranched macromonomer used in the present invention is a multibranched macromonomer having a branched structure containing a repeating structural unit selected from a group consisting of ester linkages, ether linkages and amide linkages, and ethylene based double bonds at the branch terminals.

Multibranched macromonomers comprising an ester linkage as the repeating structural unit are structures produced by introducing ethyleny double bonds such as vinyl groups or isopropenyl groups into a multibranched polyester polyol containing a molecular chain in which the carbon atoms adjacent to the carbonyl groups of the ester linkages which form the molecular chain are tertiary carbon atoms. The introduction of these ethylene based double bonds into the multibranched polyester polyol can be performed via an esterification reaction or an addition reaction.

Examples of the above type of multibranched polyester polyol that are available commercially include "Boltorn H20, H30 and H40", manufactured by Perstorp AB.

The above multibranched polyester polyols may already contain substituents that are bonded via an ether linkage or some other linkage at a portion of the hydroxyl groups, or alternatively a portion of the hydroxyl groups may have been modified by an oxidation reaction or some other type of reaction.

Furthermore, a portion of the hydroxyl groups of the multibranched polyester polyol may have already been esterified.

Representative examples of this type of multibranched macromonomer include structures produced by forming a multibranched polymer by reacting a compound with at least one hydroxyl group, with a monocarboxylic acid compound having at least two hydroxyl groups in which the carbon atom adjacent to the carboxyl group is a tertiary carbon atom, and subsequently reacting the terminal hydroxyl groups of the polymer with an unsaturated acid such as acrylic acid or methacrylic acid, or with an isocyanate group containing acrylic based compound. Examples of multibranched polymers comprising ester linkages as the repeating structural unit are also disclosed by Tamalia et al. in "Angew. Chem. Int. Ed. Engl. 29" on pages 138 to 177 (1990).

Examples of the aforementioned compound having at least one hydroxyl group include a) aliphatic diols, alicyclic diols and aromatic diols, b) triols, c) tetraols, d) sugar alcohols such as sorbitol and mannitol, e) anhydro-enneaheptitol or dipentaerythritol, f) α-alkylglycosides such as α-methylglycoside, g) monofunctional alcohols such as ethanol and hexanol, and h) hydroxyl group containing polymers having a molecular weight of at most 8000, given by reacting an alkylene oxide or a derivative thereof having the hydroxyl groups of one or more of the alcohols selected from a) to g) above.

Examples of suitable aliphatic diols, alicyclic diols and aromatic diols include 1,2-ethanediol, 1,3-propanediol, 1,4-butanediol, 1,5-pentanediol, 1,6-hexanediol, polytetrahydrofuran, dimethylolpropane, neopentylpropane, 2-propyl-2-ethyl-1,3-propanediol, 1,2-propanediol, 1,3-butanediol, diethylene glycol, triethylene glycol, polyethylene glycol, dipropylene glycol, tripropylene glycol, and polypropylene glycol; cyclohexanedimethanol and 1,3-dioxane-5,5-dimethanol; and 1,4-xylylenedimethanol and 1-phenyl-1,2-ethanediol.

Examples of suitable triols include trimethylolpropane, trimethylolethane, trimethylolbutane, glycerol, and 1,2,5-hexanetriol.

Examples of suitable tetraols include pentaerythritol, ditrimethylolpropane, diglycerol, and ditrimethylolethane.

Examples of aromatic compounds having at least two hydroxyl groups bonded to an aromatic ring include 1,3,5-trihydroxybenzene, 1,4-xylylenedimethanol, and 1-phenyl-1,2-ethanediol.

Examples of the monocarboxylic acid compound having at least two hydroxyl groups in which the carbon atom adjacent to the carboxyl group is a tertiary carbon atom include dimethylolpropionic acid, α,α-bis(hydroxymethyl) butyric acid, α,α,α-tris(hydroxymethyl)acetic acid, α,α-bis (hydroxymethyl)valeric acid, and α,α-bis(hydroxymethyl) propionic acid. By using this type of monocarboxylic acid compound, the ester decomposition reaction can be suppressed, enabling formation of a multibranched polyester polyol.

A catalyst is preferably used during the production of the above multibranched polymer, and suitable examples of this catalyst include organotin compounds such as dialkyltin oxides, halogenated dialkyltin, dialkyltin biscarboxylates, or stannoxane, titanates such as tetrabutyl titanate, and organic sulfonic acids such as Lewis acid and paratoluenesulfonic acid.

Multibranched macromonomers having an ether linkage as the repeating structural unit include structures produced by forming a multibranched polymer by reacting a compound with at least one hydroxyl group, with a cyclic ether compound having at least one hydroxyl group, and subsequently reacting the terminal hydroxyl groups of this polymer with an unsaturated acid such as acrylic acid or methacrylic acid, an isocyanate group containing acrylic based compound, or a halogenated methylstyrene such as 4-chloromethylstyrene. Furthermore an effective process for producing the multibranched polymer is based on the Williamson ether synthesis, and involves reacting a compound having at least one hydroxyl group, with a compound comprising two or more hydroxyl groups, and a halogen atom, $-OSO_2OCH_3$ or $-OSO_2CH_3$.

The compound having at least one hydroxyl group can utilize the same compounds described above.

Suitable examples of the cyclic ether compound having at least one hydroxyl group include 3-ethyl-3-(hydroxymethyl) oxetane, 2,3-epoxy-1-propanol, 2,3-epoxy-1-butanol, and 3,4-epoxy-1-butanol.

The compound having at least one hydroxyl group used in the Williamson ether synthesis may utilize one of the compounds described above, although aromatic compounds having at least two hydroxyl groups bonded to the aromatic ring are preferred. Representative examples of this type of compound include 1,3,5-trihydroxybenzene, 1,4-xylylene-dimethanol, and 1-phenyl-1,2-ethanediol.

Furthermore, examples of the compound comprising two or more hydroxyl groups, and a halogen atom, $-OSO_2OCH_3$ or $-OSO_2CH_3$ include 5-(bromomethyl)-1,3-dihydroxybenzene, 2-ethyl-2-(bromomethyl)-1,3-propanediol, 2-methyl-2-(bromomethyl)-1,3-propanediol, and 2-(bromomethyl)-2-(hydroxymethyl)-1,3-propanediol.

A catalyst is preferably used during the production of the multibranched polymer described above, and suitable examples of this catalyst include $BF_3$ diethyl ether, $FSO_3H$, $ClSO_3H$, and $HClO_4$.

Furthermore, multibranched macromonomers having an amide linkage as the repeating structural unit include structures in which the amide linkage forms the repeating unit via the nitrogen atom, and a representative example of such a structure is the product Generation 2.0 (a PAMAM Dendrimer) manufactured by Dendritech Inc.

As the number of branch terminal double bonds introduced into the multibranched macromonomer increases, the degree of branching of the multibranched polystyrene produced through a copolymerization with styrene also increases. The degree of branching (DB) of the multibranched macromonomer used in the present invention is defined by a formula (3) shown below, and this degree of branching (DB) preferably falls within a range from 0.3 to 0.8.

$$DB=(D+L)/(D+T+L) \quad (3)$$

(wherein, D denotes the number of dendritic units, L denotes the number of linear units, and T denotes the number of terminal units)

The values of D, L and T described above can be determined from the active methylene groups, and the numbers of secondary, tertiary and quaternary carbon atoms, or the numbers of primary, secondary and tertiary nitrogen atoms derived from reaction of such methylene groups, as measured by $^{13}$C-NMR. For example, D corresponds to the number of quaternary carbon atoms or the number of tertiary nitrogen atoms, L corresponds to the number of tertiary carbon atoms or the number of secondary nitrogen atoms, and T corresponds to the number of secondary carbon atoms or the number of primary nitrogen atoms.

In order to control the weight average molecular weight of the multibranched polystyrene to a value of 10,000,000 or less, the weight average molecular weight of the multibranched macromonomer used in the present invention is preferably within a range from 1000 to 15,000, and even more preferably from 2000 to 5000.

The quantity of double bonds bonded directly to an aromatic ring introduced into the multibranched macromonomer is preferably within a range from 0.1 to 5.5 milli mols, and even more preferably from 0.5 to 3.5 milli mols, per 1 g of the multibranched macromonomer. If this quantity is less than 0.1 milli mols, producing a high molecular weight multibranched polystyrene becomes difficult, whereas if the quantity exceeds 5.5 millimols, the molecular weight of the multibranched polystyrene increases excessively.

By polymerizing an aforementioned multibranched macromonomer with styrene, a styrene resin composition of the present invention is obtained, comprising a mixture of a multibranched polystyrene, which is a copolymer of the multibranched macromonomer and styrene, and a linear polystyrene that is given at the same time.

Known styrene polymerization processes can be used for the polymerization reaction. Although there are not particular restrictions on the polymerization system used, bulk polymerization, suspension polymerization or solution polymerization are preferred. Thermal polymerization can be conducted, without using a polymerization initiator, but the use of a typical radical polymerization initiator is preferred. Furthermore, polymerization auxiliary agents required by the polymerization such as suspension agents or emulsifiers can utilize conventional materials used in typical polystyrene production processes.

The concentration of the multibranched macromonomer based on the total amount of the multibranched macromonomer and the styrene is preferably within a range from 50 ppm to 1%, and even more preferably from 100 to 2000 ppm. If the proportion of the multibranched macromonomer is less than 50 ppm, then the effects of the present invention are not manifested adequately.

An organic solvent may be added to the reaction system to lower the viscosity of the reactants in the polymerization reaction, and examples of suitable organic solvents include toluene, ethylbenzene, xylene, acetonitrile, benzene, chlorobenzene, dichlorobenzene, anisole, cyanobenzene, dimethylformamide, N,N-dimethylacetamide, and methyl ethyl ketone.

Particularly in those cases where the amount of the multibranched macromonomer is large, from the viewpoint of suppressing gelation, the use of an organic solvent is preferred. Adding an organic solvent enables the amount of the multibranched macromonomer described above to be increased markedly without any danger of gelation.

There are not particular restrictions on the radical polymerization initiator used, and conventional materials are suitable, including peroxyketals such as 1,1-bis(t-butylperoxy)cyclohexane, 2,2-bis(t-butylperoxy)butane and 2,2-bis(4,4-di-t-butylperoxycyclohexyl)propane; hydroperoxides such as cumene hydroperoxide, and t-butyl hydroperoxide; dialkyl peroxides such as di-t-butyl peroxide, dicumyl peroxide and di-t-hexylperoxide; diacyl peroxides such as benzoyl peroxide and dicinnamoyl peroxide; peroxyesters such as t-butyl peroxybenzoate, di-t-butyl peroxyisophthalate and t-butyl peroxyisopropylmonocarbonate; and N,N'-azobisisobutyronitrile, N,N'-azobis(cyclohexane-1-carbonitrile), N,N'-azobis(2-methylbutyronitrile), N,N'-azobis(2,4-dimethylvaleronitrile), and N,N'-azobis[2-(hydroxymethyl)propionitrile]. These polymerization initiators can be used singularly, or in combinations of two or more compounds.

In addition, a chain transfer agent may also be added to ensure that the molecular weight of the styrene resin composition does not become overly high. The chain transfer agent may utilize either a monofunctional chain transfer agent having one chain transfer group, or a multifunctional chain transfer agent having a plurality of chain transfer groups. Examples of suitable monofunctional chain transfer agents include alkylmercaptans and thioglycolate esters.

Examples of suitable multifunctional chain transfer agents include compounds in which the hydroxyl groups of a polyhydric alcohol such as ethylene glycol, neopentyl glycol, trimethylolpropane, pentaerythritol, dipentaerythritol, tripentaerythritol or sorbitol have undergone esterification with either thioglycolic acid or 3-mercaptopropionic acid.

In addition to the process described above for producing a styrene resin composition of the present invention via a single stage polymerization of a multibranched macromonomer and styrene, a styrene resin composition with a desired ratio between a multibranched polystyrene and a linear polystyrene may also be produced by synthesizing the linear polystyrene and the multibranched polystyrene separately, and then mixing the two together.

In a styrene resin composition of the present invention, because the multibranched polystyrene and the linear polystyrene are interdispersed and mixed together uniformly at the molecular level and entangle together, in folding tests and the like, the composition exhibits a superior level of folding endurance than has previously been possible with conventional linear polystyrenes. In terms of achieving a resin composition in which the multibranched polystyrene and the linear polystyrene are interdispersed and mixed together uniformly at the molecular level, a single stage polymerization of a multibranched macromonomer and styrene is preferred over the process in which separately prepared polymers of a multibranched polystyrene and a linear polystyrene are mixed together. The single stage polymerization is also preferred in terms of production efficiency.

When the molecular weight of a styrene resin composition of the present invention is measured using gel permeation chromatography (GPC), a peak derived from the linear polystyrene appears on the low molecular weight side, and a peak derived from the multibranched polystyrene appears on the high molecular weight side, and the ratio of the areas under the two peaks can be used to determine the compositional proportions of both type of polystyrenes, and the weight average molecular weight of each polystyrene.

In order to ensure that a styrene resin composition of the present invention produces a molded product with favorable melt tension and good strength such as folding endurance, while also exhibiting a high melt mass-flow rate and excellent moldability, the weight average molecular weight of the linear polystyrene contained within the styrene resin composition is typically within a range from 200,000 to 350,000, and the weight average molecular weight of the multibranched polystyrene is typically within a range from 1,000,000 to 10,000,000, and preferably from 2,000,000 to 5,000,000. If the weight average molecular weight of the multibranched polystyrene is less than 1,000,000 then satisfactory strength cannot be achieved, whereas if the molecular weight exceeds 10,000,000, achieving a favorable level of moldability is impossible.

In addition, the weight average molecular weight of the styrene resin composition is typically within a range from 250,000 to 700,000, and preferably from 280,000 to 500,000. Furthermore, the weight ratio between the linear polystyrene and the multibranched polystyrene within the resin composition, is preferably within a linear polystyrene:multibranched polystyrene range from 99.1:0.9 to 75:25, and even more preferably from 99:1 to 85:15.

A styrene resin composition of the present invention comprises an ultra high molecular weight multibranched polystyrene not seen in conventional linear polystyrenes, but despite the fact that the styrene resin composition of the present invention contains such a ultra high molecular weight component as this, gelation is effectively non-existent, enabling the composition to be easily dissolved in organic solvents.

The melt mass-flow rate of a styrene resin composition of the present invention satisfies the relationship having the weight average molecular weight expressed in the formula (1), and has a higher melt mass-flow rate than a conventional linear polystyrene having the same weight average molecular weight.

$$MFR(g/10\ min) \wedge 45 \times \exp(-0.1 \times Mw \times 10^{-4}) \qquad \text{Formula (1)}$$

(wherein, MFR and Mw denote the melt mass-flow rate and the weight average molecular weight respectively for the styrene resin composition)

The melt mass-flow rate (MFR, g/10 min) refers to the value measured at 200° C. under a load of 49 N, in accordance with the method of JIS K7210:99.

If the MFR of the styrene resin composition is lower than the value calculated from the above formula (1), a favorable level of moldability cannot be achieved.

Furthermore, the melt tension (MT), which functions as an indicator of the strength and moldability of the styrene resin composition of the present invention, satisfies the relationship with the weight average molecular weight expressed in the formula (2), and is higher than the melt tension value of a conventional linear polystyrene having the same weight average molecular weight.

$$MT(g) \wedge 0.07 Mw \times 10^{-4} + 1.8 \qquad \text{Formula (2)}$$

(wherein, MT and Mw denote the melt tension and the weight average molecular weight respectively for the styrene resin composition) The melt tension (MT) describes the tensile force during melting of the resin, and acts as an indicator of the toughness and moldability of the resin. As the melt tension increases, the tensile force on melting of the resin increases, enabling the production speed during extrusion molding to be increased.

The melt tension (MT) values reported in the present invention were measured using a Capirograph (type 1B, manufactured by Toyo Seiki Seisaku-sho, Ltd.), and refer to values MT (g) measured with a capillary of length (L) 50.80 mm and diameter (D) 1.27 mm, a barrel diameter (B) of 9.55 mm and a shear rate of 60 m/s, at a temperature which yields a melt viscosity for the sample of 1300 Pa·s, and with a strand taking-off speed of 20 m/min. If the MT of the styrene resin composition is lower than the value calculated from the above formula (2), then the toughness and the moldability of the resin composition tend to deteriorate.

A styrene resin composition of the present invention comprising a multibranched polystyrene is of high molecular weight, and yet when compared to a conventional linear polystyrene having a similar molecular weight, exhibits a higher melt mass-flow rate, superior fluidity during production and molding of the styrene resin composition, and a superior level of productivity and processability. As a result, the styrene resin composition of the present invention can be used in a wider variety of fields than conventional compositions, in the production of molded products from a variety of molding methods such as injection molding, extrusion molding, vacuum forming, air pressure forming, extrusion foam molding, calendering and blow molding methods.

EXAMPLES

The following is a more detailed description of the present invention based on a series of examples. The present invention is not restricted by the examples presented below. First is a description of the measurement methods employed.

(GPC Measurement Method)

High speed liquid chromatography (HLC-8220GPC, manufactured by Tosoh Corporation) is used, with an RI detector, using TSKgel G6000H×1+G5000H×1+G4000H×1+G3000H×1+TSKguard columnh×1–H, THF solvent, a flow rate of 1.0 ml/min., and a temperature of 40° C.

Analysis of the chromatograph was conducted using a multistation GPC-8020, enabling the two peaks that appeared to be separated using analysis software, and the weight average molecular weight to be determined for both the linear polystyrene and the multibranched polystyrene. The results are shown in Table 1 to Table 3. The labels P1Mw and P2Mw in the tables refer to the weight average molecular weight of the linear polystyrene and the multibranched polystyrene respectively. Furthermore, the weight average molecular weight of the entire resin composition prior to the separation analysis of the two peaks is recorded as the overall Mw, and the maximum detected Mw value is recorded as the maximum Mw.

Figure 2:
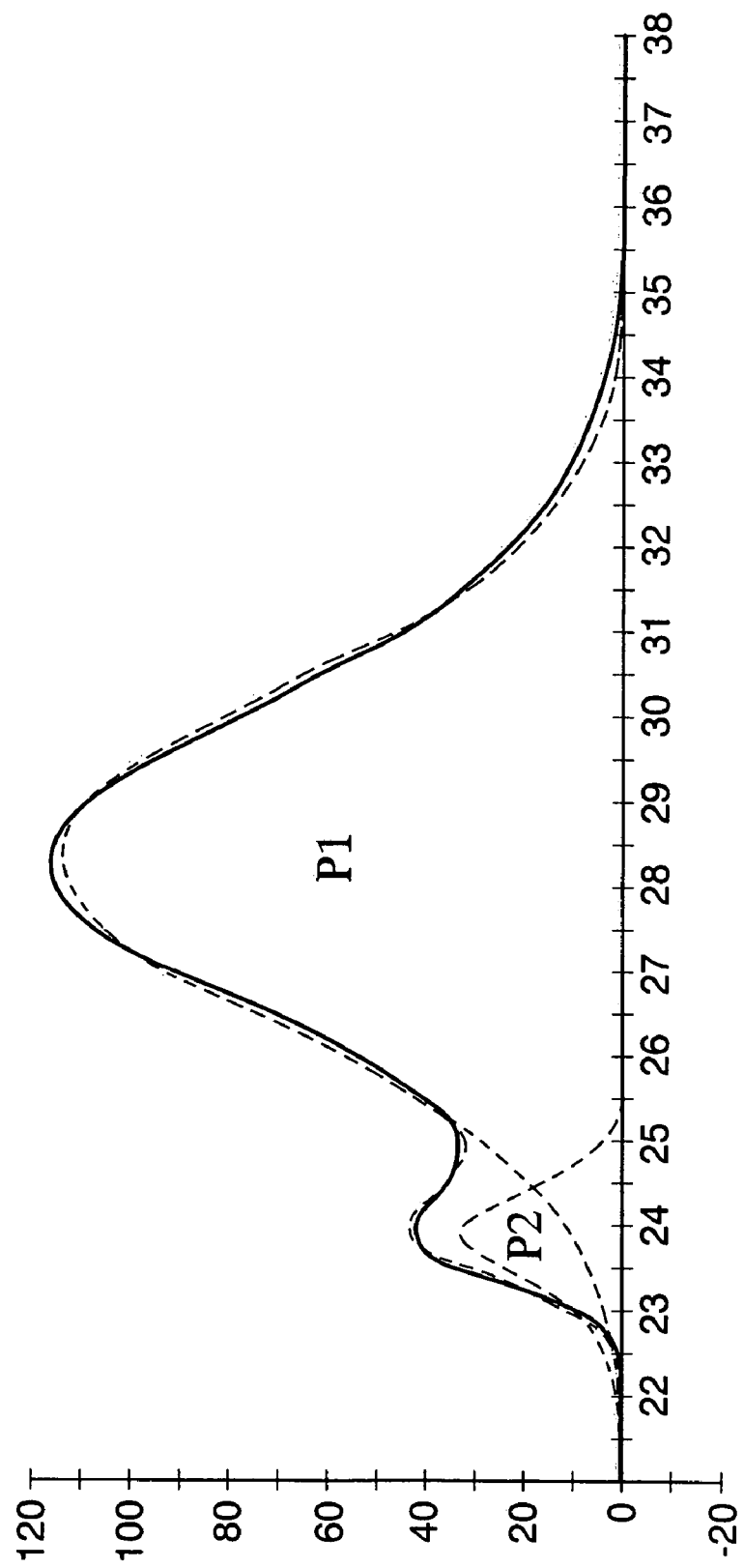
FIG. 2 is a GPC chromatograph of a resin composition of an example 2. The horizontal axis represents retention time and the vertical axis represents peak strength.

The chromatograph for an example 2 is shown in FIG. 2. The horizontal axis represents the retention time, and the vertical axis represents the peak strength, and component peaks at shorter retention times represent higher molecular weights. In the figure, the solid line represents the peaks obtained during actual measurement, and the dashed lines represents the peaks produced as a result of the analysis. The peak at the higher molecular weight side of the chromatograph represents the multibranched polystyrene (P2), and the peak at the lower molecular weight side represents the linear polystyrene (P1).

(NMR Measurement Method)

Nuclear magnetic spectroscopy ($^1$H-NMR) was used to determine the quantity of ethyleny double bonds in the multibranched macromonomer, and was recorded as a number of mols per weight unit of the sample. Furthermore, $^{13}$C-NMR was used to determine the active methylene groups and the numbers of secondary, tertiary and quaternary carbon atoms derived from reactions of such methylene groups, thereby determining the degree of branching of the multibranched macromonomer.

(Melt Mass-Flow Rate Measurement Method)

Measured in accordance with JIS K7210:99. The measurement conditions included a temperature of 200° C. and a load of 49 N.

(Melt Tension Measurement Method)

The melt tension was determined using a Capirograph (type 1B, manufactured by Toyo Seiki Seisaku-sho, Ltd.). The capillary of the device used had a length (L) of 50.80 mm and a diameter (D) of 1.27 mm, and the MT (g) value was determined with a barrel diameter (B) of 9.55 mm and a shear rate of 60 m/s, at a temperature which yields a melt viscosity for the sample of 1300 Pa·s, and with a strand taking-off speed of 20 m/min.

(Glass Transition Temperature Measurement Method)

A film having a thickness of 0.4 mm was prepared from a sample material, and the glass transition temperature (Tg) was determined using a dynamic viscoelasticity apparatus (DMA, manufactured by Rheometrics Ltd.).

(Toluene Insoluble Fraction Measurement Method)

A sample was dissolved in toluene having a concentration of 1 g/100 ml, and the insoluble fraction within the solution was separated by centrifuging at 12,000 rpm for 30 minutes. The centrifuged toluene insoluble fraction was dried, the dried weight was measured, and the toluene insoluble fraction was determined using the following formula.

Toluene insoluble fraction (%)=[weight of dried insoluble fraction/weight of sample]×100

(Folding Endurance Measurement Method)

A molded plate produced by hot pressing was converted to a sheet of thickness 0.2 mm using a simultaneously biaxially stretching machine. The stretching temperature was 130° C., and the stretching magnification was set to 2.3-fold in both directions. A portion of this sheet was used to determine the folding endurance, by measuring the number of folding repetitions required until rupture, in accordance with JIS P-8115.

Reference Example 1

Synthesis of a Multibranched Macromonomer (M-m1)

In a 1000 ml recovery flask equipped with a stirring device, a dropping funnel, a thermometer, a nitrogen input device and a bubbler, 35 g of 4-bromo-di(ethyleneoxy) phenylacetonitrile was dissolved in 800 ml of dimethylsulfoxide (DMSO) under an atmosphere of nitrogen. The flask was placed in a water bath, and once the internal temperature had reached 30° C., 66 ml of a 50% aqueous solution of sodium hydroxide was added dropwise. The resulting mixture was stirred for 2 hours with the temperature maintained at 30° C., yielding a multibranched macromonomer precursor. By subsequently adding 56.6 g of 4-chloromethylstyrene in a dropwise manner to the reaction mixture, and then continuing stirring for a further 2 hours, a solution of a multibranched macromonomer was formed.

The product solution was filtered to remove the solid fraction, and the resulting filtrate was poured into 5 L of methanol containing 225 ml of a 5 mol/L hydrochloric acid solution, thereby precipitating the multibranched macromonomer. The precipitated multibranched macromonomer was filtered under suction, and washed 3 times each with distilled water and methanol. The obtained multibranched macromonomer was dried under reduced pressure for 24 hours, yielding 24 g of a multibranched macromonomer (M-m1).

Measurement by GPC of the thus obtained multibranched macromonomer (M-m1) showed a weight average molecular weight of 11,000. Furthermore, $^1$H-NMR measurements confirmed that the quantity of introduced double bonds bonded directly to an aromatic ring was 2.66 millimols/g. The degree of branching was 0.6.

Reference Example 2

Synthesis of a Multibranched Macromonomer (M-m2)

With the exception of replacing the 4-bromodi(ethyleneoxy)phenylacetonitrile from the reference example 1 with 4-tosyloxydi(ethyleneoxy)phenylacetonitrile, synthesis was conducted in the same manner as the reference example 1, and yielded 25 g of a multibranched macromonomer (M-m2). The weight average molecular weight of the product multibranched macromonomer (M-m2) was 5,800. $^1$H-NMR measurements showed that the quantity of introduced double bonds bonded directly to an aromatic ring was 2.04 millimols/g.

Reference Example 3

Synthesis of a Multibranched Macromonomer (M-m3)

With the exception of replacing the 66 ml of the 50% aqueous solution of sodium hydroxide from the reference example 2 with 6.6 ml of the 50% aqueous solution of sodium hydroxide, synthesis was conducted in the same manner as the reference example 2, and yielded 29 g of a multibranched macromonomer (M-m3). The weight average molecular weight of the product multibranched macromonomer (M-m3) was 7,000. $^1$H-NMR measurements showed that the quantity of introduced double bonds bonded directly to an aromatic ring was 1.84 millimols/g.

Reference Example 4

Synthesis of a Multibranched Macromonomer (M-m4)

(Synthesis of a Multibranched Polyether Polyol 1)

A 2 liter flask equipped with a stirrer, a thermometer, a dropping funnel and a condenser was charged with 50.5 g of ethoxylated pentaerythritol (5 mol-ethylene oxide adduct of pentaerythritol) and 1 g of $BF_3$ diethyl ether solution (50 percent) under room temperature conditions, and the mixture was then heated to 110° C. 450 g of 3-ethyl-3-(hydroxymethyl)oxetane was then added slowly over a 35 minute period, while the heat given by the reaction was controlled. Once the reaction heat had subsided, the reaction mixture was heated with stirring for a further 3.5 hours at 120° C., and then cooled to room temperature.

The weight average molecular weight of the product multibranched polyether polyol was 3,500, and the hydroxyl value was 510.

(Synthesis of a Multibranched Polyether with Methacryloyl Groups and Acetyl Groups 1)

A reaction vessel equipped with a stirrer, a thermometer, a Dean-Stark decanter containing a condenser, and a gas inlet tube was charged with 50 g of the multibranched polyether polyol prepared above in the (synthesis of a multibranched polyether polyol 1), 13.8 g of methacrylic acid, 150 g of toluene, 0.06 g of hydroquinone, and 1 g of paratoluenesulfonic acid, and the mixture was stirred under normal pressure conditions and heated, while nitrogen gas containing 7% oxygen was bubbled through the mixed solution at a rate of 3 ml/minute. The level of heating was adjusted so that the volume of distillate entering the decanter was 30 g per hour, and heating was continued until the dewatering quantity reached 2.9 g.

Following completion of the reaction, the mixture was cooled, 36 g of acetic anhydride and 5.7 g of sulfamic acid were added, and the resulting mixture was stirred for 10 hours at 60° C. Subsequently, the mixture was washed 4 times with 50 g samples of a 5% aqueous solution of sodium hydroxide to remove any residual acetic acid and hydroquinone, and then washed once with 50 g of a 1% aqueous solution of sulfuric acid, and twice with 50 g samples of water. 0.02 g of methoquinone was added to the thus obtained organic phase, and the solvent was then removed under reduced pressure while 7% oxygen gas was passed through the system, thereby yielding 60 g of a multibranched polyether containing isopropenyl groups and acetyl groups. The weight average molecular weight of the thus obtained multibranched polyether was 4500, and the degree of incorporation of isopropenyl groups and acetyl groups into the multibranched polyether polyol was 35% and 60% respectively.

Reference Example 5

Synthesis of a Multibranched Macromonomer (M-m5)

(Synthesis of a Multibranched Polyether with Styryl Groups and Acetyl Groups 1)

A reaction vessel equipped with a stirrer, a condenser containing a drying tube, a dropping funnel, and a thermometer was charged with 50 g of the multibranched polyether polyol prepared above in the (synthesis of a multibranched polyether polyol 1), 100 g of tetrahydrofuran, and 4.3 g of sodium hydride, and the mixture was stirred at room temperature. 26.7 g of 4-chloromethylstyrene was added dropwise to the reaction system over a period of one hour, and the resulting reaction mixture was then stirred for a further 4 hours at 50° C.

Following completion of the reaction, the mixture was cooled, 34 g of acetic anhydride and 5.4 g of sulfamic acid were added, and the resulting mixture was stirred for 10 hours at 60° C. Subsequently, the tetrahydrofuran was removed under reduced pressure, the resulting mixture was dissolved in 150 g of toluene, and the toluene solution was washed 4 times with 50 g samples of a 5% aqueous solution of sodium hydroxide to remove any residual acetic acid, and then washed once with 50 g of a 1% aqueous solution of sulfuric acid, and twice with 50 g samples of water. The solvent was then removed from the organic phase under reduced pressure, yielding 70 g of a multibranched polyether containing styryl groups and acetyl groups. The weight average molecular weight of the thus obtained multibranched polyether was 5300, and the degree of incorporation of styryl groups and acetyl groups into the multibranched polyether polyol was 40% and 55% respectively.

Reference Example 6

Synthesis of a Multibranched Macromonomer (M-m6)

(Synthesis of a PAMAM Dendrimer with Styryl Groups)

A reaction vessel equipped with a stirrer, a condenser containing a drying tube, a dropping funnel, and a thermometer was charged with 50 g of a methanol solution (20% by weight) of a PAMAM dendrimer (product name Generation 2.0, manufactured by Dendritech Inc.), and with constant stirring, the methanol was removed under reduced pressure. Subsequently, 50 g of tetrahydrofuran and 2.6 g of finely powdered potassium hydroxide were added, and the resulting mixture was stirred at room temperature. 7.2 g of 4-chloromethylstyrene was then added dropwise to the reaction system over a period of 10 minutes, and the resulting reaction mixture was then stirred for a further 4 hours at 50° C.

Following completion of the reaction, the mixture was cooled, and following removal of the solid matter by filtration, the tetrahydrofuran was removed under reduced pressure, yielding 14 g of a PAMAM dendrimer containing styryl groups. The styryl group content of the product dendrimer was 3.0 millimols/gram.

Reference Example 7

Synthesis of a Multibranched Macromonomer (M-m7)

(Synthesis of a Multibranched Polyether Polyol with Styryl Groups and Acetyl Groups 2)

A light shielded reaction vessel capable of nitrogen sealing and equipped with a stirrer, a condenser, a light shielded dropping funnel and a thermometer was charged with 0.5 g of anhydrous 1,3,5-trihydroxybenzene, 29 g of potassium carbonate, 2.7 g of 18-crown-6, and 180 g of acetone under a stream of nitrogen, and with the mixture undergoing constant stirring, a solution comprising 21.7 g of 5-(bromomethyl)-1,3-dihydroxybenzene and 180 g of acetone was added dropwise over a period of 3 hours. The mixture was heated and refluxed with continuous stirring until the 5-(bromomethyl)-1,3-dihydroxybenzene had been eliminated.

Subsequently, 10.3 g of 4-chloromethylstyrene was added, and heated and refluxed under constant stirring was continued until the 4-chloromethylstyrene had been eliminated. 4 g of acetic anhydride and 0.6 g of sulfamic acid were then added to the reaction mixture, and stirring was continued overnight at room temperature. Following cooling, the solid matter in the reaction mixture was removed by filtration, and the solvent was removed under reduced pressure. The resulting mixture was dissolved in dichloromethane, washed 3 times with water, and the dichloromethane solution was then added dropwise to hexane to precipitate the multibranched polyether. This precipitate was filtered and dried, yielding 14 g of a multibranched polyether polyol containing styryl groups and acetyl groups. The weight average molecular weight was 4050, and the styryl group content was 3.3 millimols/gram.

Reference Example 8

Synthesis of a Multibranched Macromonomer (M-m8)

(Synthesis of a Multibranched Polyester Polyol with Methacryloyl Groups and Acetyl Groups)

A reaction vessel equipped with a 7% oxygen inlet tube, a thermometer, a Dean-Stark decanter containing a condenser, and a stirrer was charged with 10 g of "Boltorn H20", 1.25 g of dibutyltin oxide, 100 g of a methyl methacrylate containing isopropenyl groups as the functional group (B), and 0.05 g of hydroquinone, and the resulting reaction mixture was heated under stirring while 7% oxygen was bubbled through the mixed solution at a rate of 3 ml/minute. The level of heating was adjusted so that the volume of distillate entering the decanter was from 15 to 20 g per hour, and the reaction was continued for 6 hours, during which period the distillate was removed from the decanter every hour and an equivalent weight of methyl methacrylate was added.

Following completion of the reaction, the methyl methacrylate was removed under reduced pressure, and 10 g of acetic anhydride and 2 g of sulfamic acid were added and stirred for 10 hours at room temperature to cap any remaining hydroxyl groups. The sulfamic acid was then removed by filtration, and following subsequent removal of the acetic anhydride and acetic acid under reduced pressure, the residue was dissolved in 70 g of ethyl acetate, and washed 4 times with 20 g samples of a 5% aqueous solution of sodium hydroxide to remove any residual hydroquinone. The resulting product was then washed a further 2 times with 20 g samples of a 7% aqueous solution of sulfuric acid, and twice with 20 g samples of water. 0.0045 g of methoquinone was added to the thus obtained organic phase, and the solvent was then removed under reduced pressure while 7% oxygen gas was passed through the system, thereby yielding 12 g of a multibranched polyester containing isopropenyl groups and acetyl groups. The weight average molecular weight of the thus obtained multibranched polyester was 2860, the number average molecular weight was 3770, and the degree of incorporation of isopropenyl groups and acetyl groups into the multibranched polyester polyol (A) was 55% and 40% respectively.

Example 1

A 5 liter stainless steel reaction vessel equipped with a turbine blade was charged with 2000 ml of ion exchange water, and following the addition and dissolution of 10 g of partially saponified polyvinyl alcohol and 0.05 g of sodium dodecylbenzenesulfonate as suspension stabilizers, 1000 g of styrene containing 0.6 g of uniformly dissolved multibranched macromonomer (M-m1), 2.8 g of benzoyl peroxide, and 0.6 g of t-butyl peroxybenzoate were added sequentially.

Following replacement of the air inside the reaction vessel with nitrogen gas, the reaction mixture was stirred at 500 rpm while the temperature was raised, and a suspension polymerization was conducted for 6 hours at 92° C., and then for a further 3 hours at 117° C. The produced granular polystyrene resin was washed, dewatered and dried to yield 980 g of a styrene resin composition. This resin was pelletized using an extruder with a cylinder temperature of 230° C. The obtained styrene resin composition was used to prepare a sheet as described in the folding endurance measurement method, and the folding endurance was measured. The result for the folding endurance was 12 repetitions.

Example 2

With the exception of replacing the multibranched macromonomer (M-m1) from the example 1 with the multibranched macromonomer (M-m2), a styrene resin composition was produced in the same manner as the example 1. The obtained styrene resin composition was used to prepare a sheet as described in the folding endurance measurement method, and the folding endurance was measured. The result for the folding endurance was 13 repetitions.

Example 3

With the exception of replacing the multibranched macromonomer (M-m I) from the example 1 with the multibranched macromonomer (M-m3), a styrene resin composition was produced in the same manner as the example 1.

Example 4

With the exception of altering the amount of the multibranched macromonomer (M-m1) from the 0.6 g added in the example 1 to 0.2 g, a styrene resin composition was produced in the same manner as the example 1.

Example 5

With the exception of altering the amount of the multibranched macromonomer (M-m1) from the 0.6 g added in the example 1 to 0.4 g, a styrene resin composition was produced in the same manner as the example 1.

Example 6

With the exception of replacing the multibranched macromonomer (M-m 1) from the example 1 with the multibranched macromonomer (M-m4), a styrene resin composition was produced in the same manner as the example 1.

Example 7

With the exception of replacing the multibranched macromonomer (M-m 1) from the example 1 with the multibranched macromonomer (M-m5), a styrene resin composition was produced in the same manner as the example 1.

Example 8

With the exception of replacing the multibranched macromonomer (M-m1) from the example 1 with the multibranched macromonomer (M-m6), a styrene resin composition was produced in the same manner as the example 1.

Example 9

With the exception of replacing the multibranched macromonomer (M-m 1) from the example 1 with the multibranched macromonomer (M-m7), a styrene resin composition was produced in the same manner as the example 1.

Example 10

With the exception of replacing the multibranched macromonomer (M-m 1) from the example 1 with the multibranched macromonomer (M-m8), a styrene resin composition was produced in the same manner as the example 1.

Comparative Example 2

With the exceptions of altering the reaction time to 7 hours, and replacing the 2.8 g of benzoyl peroxide and 0.6 g of t-butyl peroxybenzoate with 3.6 g of 1,1-bis(t-butylperoxy)-3,3,5-trimethylcyclohexane and 0.3 g of t-butyl peroxybenzoate, the same method as the comparative example 1 was used to prepare a linear polystyrene.

Comparative Example 3

With the exception of replacing the 2.8 g of benzoyl peroxide and 0.6 g of t-butyl peroxybenzoate with 2.3 g of 1,1-bis(t-butylperoxy)-3,3,5-trimethylcyclohexane and 0.5 g of t-butyl peroxybenzoate, the same method as the comarative example 1 was used to prepare a linear polystyrene.

Comparative Example 4

With the exception of adding 12 g of liquid paraffin (Daphne oil CP-50S, manufactured by Idemitsu Kosan Co. Ltd.) and the styrene, the same method as the comparative example 3 was used to prepare a linear polystyrene.

Example 11

With the exception of altering the amount added of the multibranched macromonomer (M-m1) to 1.5 g, a styrene resin composition was produced in the same manner as the example 1.

Example 12

A mixture of the styrene resin composition obtained in the example 6 and the linear polystyrene obtained in the comparative example 2, combined in a weight ratio of 7:3, was subjected to melt kneading in an extruder, thereby yielding a styrene resin composition with a new, altered composition.

TABLE 1

|  | Example 1 | Example 2 | Example 3 | Example 4 |
|---|---|---|---|---|
| Macromonomer | M-m1 | M-m2 | M-m3 | M-m1 |
| Amount added of macromonomer (ppm) | 600 | 600 | 600 | 200 |
| Overall Mw ($\times 10^4$) | 38.9 | 42.5 | 45.8 | 32.1 |
| P1Mw ($\times 10^4$) | 31.8 | 33.0 | 38.6 | 32.9 |
| P2Mw ($\times 10^4$) | 221 | 224 | 262 | 213 |
| P1/P2 (—) | 93/7 | 93/7 | 94/6 | 99/1 |
| Maximum Mw ($\times 10^4$) | 1,767 | 1,326 | 3,019 | 633 |
| MFR (g/10 min) | 1.3 | 0.9 | 0.5 | 2.7 |
| MT (g) | 5.2 | 5.7 | 6.5 | 4.6 |
| Toluene insoluble fraction (weight %) | 0 | 0 | 0 | 0 |
| Tg (° C.) | 106 | 106 | 106 | 106 |

TABLE 2

|  | Comparative Example 1 | Comparative Example 2 | Comparative Example 3 | Comparative Example 4 |
|---|---|---|---|---|
| Macromonomer | — | — | — | — |
| Amount added of macromonomer (ppm) | — | — | — | — |
| Overall Mw ($\times 10^4$) | 25.5 | 33.0 | 40.2 | 40.2 |
| P1Mw ($\times 10^4$) | 25.5 | 33.0 | 40.2 | 40.2 |
| P2Mw ($\times 10^4$) | — | — | — | — |
| P1/P2 (—) | 100/0 | 100/0 | 100/0 | 100/0 |
| Maximum Mw ($\times 10^4$) | 490 | 500 | 500 | 500 |
| MFR (g/10 min) | 2.2 | 1.4 | 0.6 | 0.9 |
| MT (g) | 3.5 | 4.0 | 4.4 | 4.2 |
| Toluene insoluble fraction (weight %) | 0 | 0 | 0 | 0 |
| Tg (° C.) | 105 | 106 | 106 | 98 |

TABLE 3

|  | Example 5 | Example 6 | Example 7 | Example 8 |
|---|---|---|---|---|
| Macromonomer | M-m1 | M-m4 | M-m5 | M-m6 |
| Amount added of macromonomer (ppm) | 400 | 600 | 600 | 600 |
| Overall Mw (×10$^4$) | 37.3 | 44.5 | 42.7 | 40.1 |
| P1Mw (×10$^4$) | 33.2 | 33.0 | 31.9 | 32.5 |
| P2Mw (×10$^4$) | 216 | 274 | 225 | 223 |
| P1/P2 (—) | 96/4 | 93/7 | 95/5 | 96/4 |
| Maximum Mw (×10$^4$) | 935 | 2,632 | 2,584 | 2,088 |
| MFR (g/10 min) | 1.5 | 0.9 | 1.1 | 1.2 |
| MT (g) | 4.8 | 5.9 | 5.1 | 5.0 |
| Toluene insoluble fraction (weight %) | 0 | 0 | 0 | 0 |
| Tg (° C.) | 106 | 106 | 106 | 106 |

TABLE 4

|  | Example 9 | Example 10 | Example 11 | Example 12 |
|---|---|---|---|---|
| Macromonomer | M-m7 | M-m8 | M-m1 | M-m1 |
| Amount added of macromonomer (ppm) | 600 | 600 | 1,500 | 1,050 |
| Overall Mw (×10$^4$) | 46.3 | 45.4 | 55.3 | 48.2 |
| P1Mw (×10$^4$) | 32.6 | 36.0 | 44.8 | 42.2 |
| P2Mw (×10$^4$) | 278 | 262 | 246 | 242 |
| P1/P2 (—) | 93/7 | 93/7 | 90/10 | 93/7 |
| Maximum Mw (×10$^4$) | 2,993 | 3,326 | 2,761 | 2,761 |
| MFR (g/10 min) | 0.6 | 0.7 | 0.5 | 0.6 |
| MT (g) | 6.7 | 7.5 | 9.5 | 8.7 |
| Toluene insoluble fraction (weight %) | 0 | 0 | 0 | 0 |
| Tg (° C.) | 106 | 106 | 106 | 106 |

Figure 3:
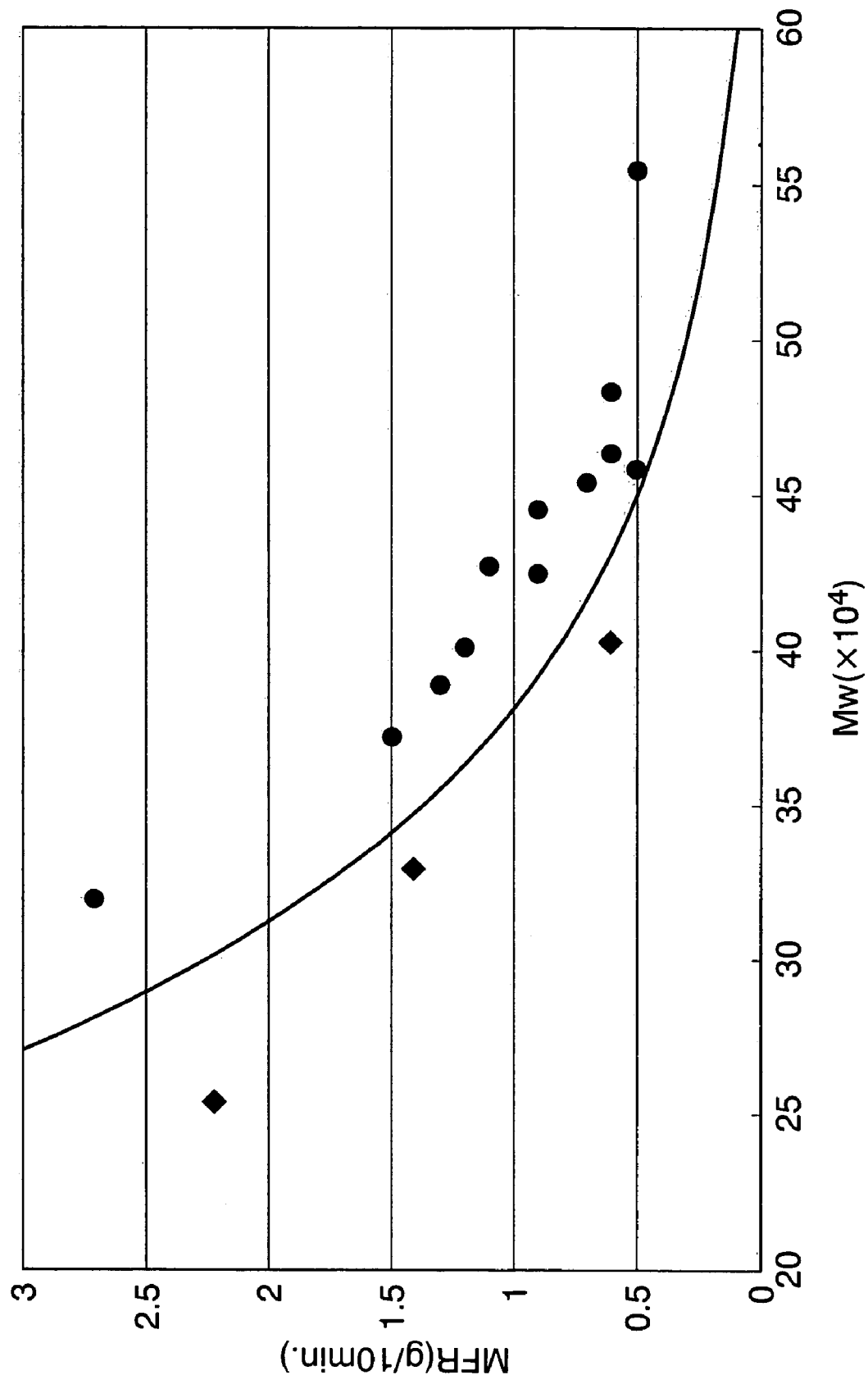
FIG. 3 is a diagram showing the relationship between the weight average molecular weight and the MFR value for examples 1 to 10 and comparative examples 1 to 3. The small circles represent the results for the examples, and the squares represent the results for the comparative examples, and the curve represents the relationship between the weight average molecular weight and MFR based on the formula (MFR=45×exp(−0.1×Mw×10$^{-4}$)).

The relationship between the weight average molecular weight and the MFR value for the examples 1 to 10 and the comparative examples 1 to 3 is shown in FIG. 3. The horizontal axis represents the molecular weight Mw (×10$^4$), the vertical axis represents the MFR value (g/10 min), and in the figure the small circles represent the results for the styrene resin compositions of the examples, and the squares represent the results for the linear polystyrenes of the comparative examples. It is evident that the styrene resin compositions of the present invention containing a multibranched polystyrene have a high weight average molecular weight while also exhibiting a comparatively high MFR value.

As is evident from the Tables 1, 2 and 3, the styrene resin compositions of the present invention containing a multibranched polystyrene exhibit higher values for the melt mass-flow rate, the melt tension and the folding endurance than conventional linear polystyrenes of the same weight average molecular weight, and consequently offer superior levels of moldability, toughness and strength.

What is claimed is:

1. A styrene resin composition comprising a linear polystyrene having a weight average molecular weight of 200,000 to 350,000 and a multibranched polystyrene obtained by copolymerizing a multibranched macromonomer and styrene having a weight average molecular weight of 1,000,000 to 10,000,000, which has a weight average molecular weight of 250,000 to 700,000, and a melt mass-flow rate (MFR) and melt tension (MT) which satisfy formulas (1) and (2) respectively:

$$MFR(g/10\ min) \wedge 45 \times \exp(-0.1 \times Mw \times 10^{-4}) \quad (1)$$

(wherein, MFR and Mw denote a melt mass-flow rate as measured at 200° C. under a load of 49N in accordance with JIS K7210:99 and a weight average molecular weight respectively for said styrene resin composition), $$MT(g) \wedge 0.07 Mw \times 10^{-4} + 1.8 \quad (2)$$

(wherein, MT and Mw denote a melt tension and a weight average molecular weight respectively for said styrene resin composition).

2. A styrene resin composition according to claim 1, wherein said multibranched polystyrene comprises a branched structure containing electron attracting groups and tertiary carbon atoms in which 3 bonds other than a bond bonded to an electron attracting group are all bonded to other carbon atoms.

3. A styrene resin composition according to claim 2, wherein a quantity of said electron attracting groups within said branched structure is within a range from $2.5 \times 10^{-4}$ to $5.0 \times 10^{-1}$ millimols per 1 g of said multibranched polystyrene.

4. A styrene resin composition according to claim 1, wherein said multibranched polystyrene is a copolymer of
(A) a multibranched macromonomer having a branched structure containing electron attracting groups and tertiary carbon atoms in which 3 bonds other than a bond bonded to an electron attracting group are all bonded to other carbon atoms, and double bonds bonded directly to an aromatic ring, and
(B) styrene.

5. A styrene resin composition according to claim 4, wherein a degree of branching of said multibranched macromonomer is within a range from 0.3 to 0.8, and a quantity of said double bonds bonded directly to an aromatic ring is within a range from 0.1 to 5.5 millimols per 1 g of said multibranched macromonomer.

6. A styrene resin composition according to claim 4, wherein said multibranched macromonomer has a branched chain comprising a repeating unit represented by a general formula (I) shown below:

General formula (I)

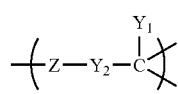

[wherein, $Y_1$ denotes an electron attracting group selected from a group consisting of —CN, —NO$_2$, —CONH$_2$, —CON(R)$_2$, —SO$_2$CH$_3$, and —P(~O)(OR)$_2$ (wherein R denotes an alkyl group or an aryl group), $Y_2$ denotes an arylene group, —O—CO— or —NH—CO—, and Z denotes a group selected from a group consisting of —(CH$_2$)$_n$O—, —(CH$_2$CH$_2$O)$_n$—, and —(CH$_2$CH$_2$CH$_2$O)$_n$—, providing that $Y_2$ is either —O—CO— or —NH—CO—, Z denotes —(CH$_2$)$_n$—, —(CH$_2$)$_n$Ar—, —(CH$_2$)$_n$O—Ar—, —(CH$_2$CH$_2$O)$_n$—Ar—, or —(CH$_2$CH$_2$CH$_2$O)$_n$—Ar— (wherein Ar denotes an arylene group and n is an integer from 1–12)].

7. A process for producing a styrene resin composition according to claim 1 by carrying out a radical polymerization of
(A) a multibranched macromonomer having a branched structure containing electron attracting groups and tertiary carbon atoms in which 3 bonds other than a bond connected to an electron attracting group are all bonded to other carbon atoms, and double bonds connected directly to an aromatic ring, and
(B) styrene.

8. A styrene resin composition according to claim 1, wherein said multibranched polystyrene comprises a branched structure containing a repeating structural unit selected from a group consisting of ester linkages, ether linkages and amide linkages.

9. A styrene resin composition according to claim 1, wherein a degree of branching of said multibranched macromonomer is within a range from 0.3 to 0.8, and a quantity of said double bonds at branch terminals is within a range from 0.1 to 5.5 millimols per 1 g of said multibranched macromonomer.

10. A process for producing a styrene resin composition according to claim 8 by carrying out a radical polymerization of
(A) a multibranched macromonomer having a branched structure containing a repeating structural unit selected from a group consisting of ester linkages, ether linkages and amide linkages, and double bonds at branch terminals, and
(B) styrene.

* * * * *